United States Patent
Remortel et al.

(10) Patent No.: US 7,582,157 B2
(45) Date of Patent: *Sep. 1, 2009

(54) PIGMENT COMPOSITION FOR PAINT

(75) Inventors: Scott Van Remortel, Mars Hill, NC (US); Christopher Capobianco, Asheville, NC (US); Thomas Gallo, Asheville, NC (US)

(73) Assignee: The Unimin Corporation, New Canaan, CT (US)

( * ) Notice: Subject to any disclaimer, the term of this patent is extended or adjusted under 35 U.S.C. 154(b) by 600 days.

This patent is subject to a terminal disclaimer.

(21) Appl. No.: 11/256,839

(22) Filed: Oct. 24, 2005

(65) Prior Publication Data

US 2007/0295247 A1   Dec. 27, 2007

(51) Int. Cl.
*C04B 14/00* (2006.01)
*B32B 5/16* (2006.01)
*B60C 1/00* (2006.01)
*C08K 3/34* (2006.01)

(52) U.S. Cl. .................. 106/400; 524/492; 428/403

(58) Field of Classification Search .......... 524/431, 524/492; 106/479, 400; 428/403
See application file for complete search history.

(56) References Cited

U.S. PATENT DOCUMENTS

| | | | |
|---|---|---|---|
| 4,053,302 A | 10/1977 | Nafziger et al. | |
| 4,243,417 A | 1/1981 | Grourke et al. | |
| 5,908,879 A | 6/1999 | Kawashima | |
| 6,136,085 A | 10/2000 | Adams | |
| 6,218,012 B1 * | 4/2001 | Rota et al. | 428/402 |
| 6,531,223 B1 * | 3/2003 | Rota et al. | 428/402 |
| 6,613,230 B2 | 9/2003 | Krulik | |
| 6,881,782 B2 | 4/2005 | Crater et al. | |
| 2002/0013401 A1 * | 1/2002 | Friel et al. | 524/501 |
| 2002/0016405 A1 * | 2/2002 | Friel et al. | 524/501 |
| 2002/0056402 A1 * | 5/2002 | Seeger et al. | 106/479 |
| 2005/0067151 A1 | 3/2005 | Miller | |
| 2006/0046099 A1 | 3/2006 | Maier | |

OTHER PUBLICATIONS

Ucar Latex 379G—The Best Just Got Better—Union Carbide.

* cited by examiner

*Primary Examiner*—Mark Eashoo
*Assistant Examiner*—Angela C Scott
(74) *Attorney, Agent, or Firm*—Fay Sharpe LLP; Brian E. Turung

(57) ABSTRACT

A pigment extender that can be used in a covering agent such as paint to improve the properties of the paint. The pigment extender can improve the hiding power of many types of paint formulations. The pigment extender is particularly useful in flat paints that require relatively low sheen values. A pigment extender that includes microcrystalline silica, nepheline syenite and/or metal fluoride. The metal fluoride typically includes a silica coated metal fluoride.

51 Claims, No Drawings

PIGMENT COMPOSITION FOR PAINT

The present invention relates to pigments, and particularly to pigment filler and/or extenders for use in coating compositions, and more particularly to pigment filler and/or extenders for use in latex paint compositions and coatings.

BACKGROUND OF THE INVENTION

Latex paint compositions have captured a significant portion of the indoor and outdoor paint market because they have several advantages compared with the organic solvent type. These advantages include easier clean up, little or no air pollution, and a reduced fire hazard. Two types of emulsions commonly used in formulating latex paints include the all acrylic system, e.g., the systems using copolymerized methyl methacrylate, butyl acrylate, 2-ethylhexyl acrylate with small proportions of acrylic acid, etc., and vinyl acetate formulations using vinyl acetate in combination with a small proportion of a lower alkyl acrylate, e.g., 2-ethylhexyl acrylate, methyl methacrylate, butyl acrylate, or dibutyl maleate. Vinyl acetate-acrylic copolymer systems have been utilized in formulating interior flat, semi-gloss paints and exterior house paints. Vinyl acetate-butyl acrylate lattices result in paint films with excellent toughness, scrub resistance and durability, while the vinyl acetate-dibutyl maleate emulsions have good abrasion resistance and flexibility as well as durability.

Paints typically include a pigment composition to achieve the desired color and hiding power of the paint. Many interior and exterior paints include hiding white pigments. Other tints and colors can be mixed with the white pigments to obtain various colored paints. The pigments used in the paint can include inorganic and organic pigments, pigment lakes, insoluble dyes and other durable coloring matter. While the pigmentation of the paint can be solely from prime pigments, it is economically impractical to use solely prime pigments at the indicated high pigment volume concentration. As such, it is common that the pigment in the paint includes a hiding prime pigment and a pigment extender. Common pigment extenders include calcium carbonate, gilders whiting talc, barytes, magnesium silicates, aluminum silicates, diatomaceous earth, china clay, asbestine, silica and mica. The relative proportions of the prime white pigment and the pigment extender in the pigment mixture may be varied widely, but usually the hiding prime pigment is present at a pigment volume concentration which provides the desired paint covering power or hiding and the extender pigment is present in an amount which provides the paint with the desired total pigment volume concentration.

SUMMARY OF THE INVENTION

The present invention is directed to a new type of pigment extender that can be used in combination with one or more pigments. The combination of pigment extender and pigment can be used in coating compositions such as paints, stains, varnishes, primer, lacquers, sealants, etc.; however, the pigment extender of the present invention has broader applications that can be used in combination with a pigment in other applications. The pigment extender of the present invention is an improvement of prior extenders such as calcium carbonate, talc, barytes, magnesium silicates, aluminum silicates, diatomaceous earth, china clay, asbestine, barium sulphate, gypsum, silica, talc and mica. These prior extenders were used to increase coverage and reduce the cost of the paint. The pigment extender of the present invention also is formulated to increase coverage and reduce the cost of a covering agent such as paint. The pigment extender of the present invention is also formulated as a full or partial substitute for one or more of the prior extenders. As such, the pigment extender of the present invention can be used as a full or partial substitute of calcined diatomaceous earth thereby reducing the amount of silica that is included in a covering agent such as a paint. The full or partial substitution of calcined diatomaceous earth or another prior extender by the pigment extender of the present invention can also result in a reduction in the cost of raw materials of the covering agent. In many paint formulations, the use of the pigment extender of the present invention can result in an increase in hiding power of the covering agent, increased matting of the covering agent, and/or improved scrub and brush resistance of the covering agent. In some covering agent formulations, the pigment extender of the present invention can fully or partially function as a filler for the covering agent.

In another non-limiting aspect of the present invention, there is provided a pigment extender that includes a combination of nepheline sydilite and a metal fluoride compound. The metal fluoride compound has been found to function as a pigment extender (e.g., $TiO_2$ extender, etc.), to increase the contract ratio of the paint and or to lower the sheen of the paint. In one non-limiting embodiment, at least a portion of the metal fluoride compound is coated with amorphous silica (e.g., silica coated calcium fluoride, etc.). The average particle size of the coated non-coated metal fluoride is generally no greater than about 170 mesh; however, larger or smaller particle sizes can be used. The silica content of the coated metal fluoride is generally about 1-40 weight percent; however, other weight percentages can be used. In one non-limiting example, the coated metal fluoride includes about 5-30 weight percent silica and 70-95 weight percent metal fluoride. In another one non-limiting example, the coated metal fluoride includes about 15-25 weight percent silica and 75-85 weight percent metal fluoride. In one non-limiting example, the metal fluoride includes calcium fluoride and has an average particle size of up to about 100 µm. In another non-limiting example, the metal fluoride includes calcium fluoride and has an average particle size of about 3-60 µm. In still another non-limiting example, the metal fluoride includes calcium fluoride and has an average particle size of about 4-40 µm. The metal fluoride when including calcium fluoride can include calcined and/or non-calcined calcium fluoride.

In one non-limiting embodiment, the weight ratio of the metal fluoride compound to nepheline syenite is about 0.1-1:1. In another non-limiting embodiment, the weight ratio of the metal fluoride compound to nepheline syenite is about 0.2-0.8:1. In still another non-limiting embodiment, the weight ratio of the metal fluoride compound to nepheline syenite is about 0.3-0.6:1. As can be appreciated, other weight ratios can be used.

In yet another and/or alternative non-limiting aspect of the present invention, the pigment extender of the present invention is used in a covering agent such as paint. Such paints can include, but are not limited to, water based paints, solvent based paints, etc. In one non-limiting example, the pigment extender is included in a water based paint. In one non-limiting aspect of this example, the one or more polymers used in water based paints can include, but are not limited to, emulsion polymers of vinyl acetate, styrene, styrene-butadiene, vinyl acetate-vinyl chloride, acrylonitrile-butadiene, isoprene, vinylidene chloride-acrylonitrile, vinylidene chloride-vinyl acetate, vinyl chloride-acrylonitrile, acrylic acid ester and methacrylic acid ester polymers and copolymers thereof with other vinyl monomers, carboxylated synthetic and natural rubbers, and so forth. Other useful and well-known water-based paints include the epoxies, alkyds, phthalic alkyds, emulsified drying oils, polystyrene, and the like. In one specific non-limiting example, the water based paint is a latex paint. One non-limiting example of the latex paint can include vinyl acrylic latex; however, it can be appreciated that many other or additional types of latex paints can be used.

In still another and/or alternative non-limiting aspect of the present invention, the pigment that is used in combination with the pigment extender includes white hiding pigments, and/or colored organic and/or inorganic pigments. The pigment is commonly used in covering agents to provide the covering agent with better "hiding power" and/or coverage. Generally the pigment has a refractive index of at least about 1.2, and typically at least about 1.8; however, it can be appreciated that the pigment can have other refractive index values. Non-limiting examples of white pigments can include, but are not limited to, rutile and/or anatase titanium dioxides, basic lead silicate, lithopone, titanate lithopone, titanium-barium pigment, titanium-calcium pigment, titanium-magnesium pigment, zinc sulfide, lead titanate, antimony oxide, zirconium oxide, barium sulfide, white lead, zinc oxide, leaded zinc oxide, and the like, and/or one or more combinations thereof. In one specific non-limiting example, the white pigment includes at least about 20% titanium dioxide. In another specific non-limiting example, the white pigment includes at least about 50% titanium dioxide. When titanium dioxide is included in the hiding pigment, the average particle size of the titanium dioxide is about 0.1-0.5 microns; however, it can be appreciated that larger or smaller particle sizes can be used. The relative proportions of the pigment and the pigment extender may be varied widely, but usually the pigment is present at a concentration that provides the desired paint covering power or hiding, and the extender pigment is present in an amount which provides the paint with the desired total pigment volume concentration. The weight ratio of pigment extender to pigment in the cover agent is generally at least about 0.1, and typically about 0.1-4:1; however, other weight ratios can be used.

In still yet another and/or alternative non-limiting aspect of the present invention, the covering agent includes a thickener. Many covering agents such as paints include thickeners to modify the rheological properties of the paint to ensure good spreading, handling, and/or other or additional application characteristics. In one non-limiting embodiment, the covering agent in the form of a paint includes a thickener such as, but not limited to, carboxylated thickeners, urethane associative thickener, polyacrylic acid thickeners, etc.; however, other or additional thickeners can be used in the covering agent.

In a further and/or alternative non-limiting aspect of the present invention, the covering agent includes one or more other ingredients such as coalescing solvents (e.g., 2-phenoxyethanol, diethylene glycol butyl ether, dibutyl phthalate, diethylene glycol, 2,2,4-trimethyl-1,1,3-pentanediol monoisobutyrate, etc.), flatting agents (e.g., silica, etc.), plasticizer, anti-foam agent, pH adjuster, tinting color, anti-freeze agent (e.g., ethylene glycol, etc.), surfactant, defoamer, dispersant, anti-foaming agents, water, solvent, odor agents, preservative and/or biocide.

In still a further and/or alternative non-limiting aspect of the present invention, the covering agent can be prepared utilizing conventional techniques. In one non-limiting embodiment, the ingredients of the covering agent can be blended together under high shear to form a mixture commonly referred to as "the grind". The consistency of this mixture is comparable to that of mud so as to efficiently disperse the ingredients with a high shear stirrer. During the preparation of the grind, high shear energy is used to break apart agglomerated particles. The ingredients not included in the grind are commonly referred to as "the letdown." The letdown is usually much less viscous than the grind, and is usually used to dilute the grind to obtain a final covering agent with the proper consistency. The final mixing of the grind with the letdown is typically carried out with low shear mixing; however, this is not required.

It is one non-limiting object of the present invention to provide a new pigment extender that can be used as a partial or full substitute for prior extenders in covering agents.

It is still another and/or alternative non-limiting object of the present invention to provide a new pigment extender that includes a combination of nepheline syenite and a silica coated metal fluoride compound.

It is yet another and/or alternative non-limiting object of the present invention to provide a new pigment extender that can reduce the amount of crystalline silica in a covering agent.

It is still yet another and/or alternative non-limiting object of the present invention to provide a new pigment extender that can reduce the amount of diatomaceous earth in a covering agent.

It is a further and/or alternative non-limiting object of the present invention to provide a new pigment extender that can improve the hiding power of a covering agent.

It is still a further and/or alternative non-limiting object of the present invention to provide a new pigment extender that can improve the matting properties of the covering agent.

It is another and/or alternative non-limiting object of the present invention to provide a new pigment extender that can reduce the raw material cost of the covering agent.

These and other objects and advantages will become apparent from the discussion of the present invention.

DETAILED DESCRIPTION OF THE INVENTION

The present invention is directed to a pigment extender that can be used in combination with a pigment to improve the properties of a covering agent such as a paint. The pigment extender is particularly useful in latex paints and will be described in detail hereinafter with reference to latex paints; however, it will be appreciated that the pigment extender can be used in other types of paints and/or covering agents.

The pigment extender is formulated to be used as a partial or full substitute for other types of extenders. One non-limiting type of prior extender that can be partially or fully substituted by the pigment extender of the present invention is calcined diatomaceous earth (e.g., Celatom MW 27, etc.). Calcined diatomaceous earth is a well known extender that is used in a number of latex paints. Two representative formulations of a flat white latex paint that include calcined diatomaceous earth are set forth below. In each of these examples, a Dow Ucar emulsion system (vinyl-acrylic emulsion) was used as a standard formulation. This emulsion system forms a good quality interior latex paint.

|  | Ex. 1 (lbs./100 Gal.) | Ex. 2 (lbs./100 Gal.) |
|---|---|---|
| Grind |  |  |
| AMP-95 | 2.0/0.25 | 0/0 |
| Celetom MW 27 | 20.0/1.04 | 38.22/2.0 |
| Colloid 226/25 | 0/0 | 6.0/0.59 |
| Drewplus L-475 | 0/0 | 4.0/0.52 |
| Duramite | 190.0/8.05 | 0/0 |
| Minex 3 | 0/0 | 131.53/6.05 |

-continued

| | Ex. 1 (lbs./100 Gal.) | Ex. 2 (lbs./100 Gal.) |
|---|---|---|
| Optiwhite | 150.0/8.2 | 0/0 |
| Propel GXL | 0/0 | 0/0 |
| Propylene Glycol | 26.0/3.02 | 10.0/1.16 |
| Rhodoline 643 | 1.5/0.21 | 0.5/0.05 |
| Snowflake PE | 0/0 | 175.0/7.75 |
| Tamol 1124 | 10.0/1.01 | 0/0 |
| Tergitol Np-9 | 0/0 | 2.2/0.25 |
| Tipure R-902 | 110.0/3.3 | 200.0/6.0 |
| Triton X-902 | 2.0/0.23 | 0/0 |
| Ucar Polyphobe 102 or 107 | 0/0 | 16.0/1.72 |
| Water | 184.0/22.09 | 358.0/43.0 |
| Let Down | | |
| Drewplus L-475 | 0/0 | 4.0/0.52 |
| Rhodoline 643 | 2.5/0.34 | 0/0 |
| Ucar Filmer IBT | 8.0/1.01 | 3.0/0.38 |
| Ucar Latex 379G | 148.0/16.35 | 200.0/22.1 |
| Ucar Polyphobe 102 or 107 | 16.0/2.41 | 18.3/1.98 |
| Water | 267.5/32.11 | 50.0/6.01 |
| Total | 1137.5/99.41 | 1221.2/100.27 |
| Pigment Cost ($/Gal.) | 1.83 | 2.54 |

The principal function of each of the components of the paint above is set forth as follows; however, it will be appreciated that one or more of these components may have other secondary functions. AMP 95 is a pH adjuster offered by Angus Chemical Co. Celetom MW 27 is an extender and flatting agent formed of calcined diatomaceous earth that is offered by Eagle-Pitcher. Celite 499 is also a calcined diatomaceous earth that can be used as a partial or full substitute of Celetom MW 27. Colloid 226/25 is a dispersant offered by Rhone-Poulenc AG. Drewplus L-475 is a defoamer offered by Ashland Specialty Chemicals. Duramite is calcium carbonate that is used as a filling agent and extender. Minex 3 is a filler and flatting agent (sheen reducing pigment) formed of nepheline syenite that is offered by Unimin Inc. Optiwhite is a pigment of calcined kaolin offered by Burgess Pigment Co. Propel GXL is dipropylene glycol that is used as a preservative and offered by Zeneca AG. Propylene Glycol is a solvent. Rhodoline 643 is a defoamer offered by Rhodia. Snowflake PE is a filler of calcium carbonate offered by IMERYS. Tamol 1124 is a dispersant offered by Rohm & Haas. Tergitol Np-9 is a surfactant offered by Dow Chemical. Tipure R-902 is a white pigment of rutile offered by DuPont. Triton X-902 is a surfactant offered by Dow Chemical. Ucar Polyphobe 102 and 107 is a rheology modifier and thickener offered by Union Carbide. Ucar Filmer IBT is a solvent offered by Union Carbide. Ucar Latex 379G is a vinyl-acrylic latex offered by Union Carbide. Water is a solvent.

The pigment extender of the present invention is formulated so as to be used as a partial or full substitute for previously used extenders such as calcined diatomaceous earth and/or calcined clay. The pigment extender of the present invention is formulated so as to be used as a partial or full substitute for previously used fillers such as calcium carbonate. The pigment extender of the present invention has been found in some paint formulations to reduce the cost of the raw materials of the paint without adversely affecting the properties of the paint. In some formulations, the pigment extender of the present invention increases the hiding power of the paint, reduces the sheen of flat paints, and improves the matting properties of the paint.

One novel formulation of the pigment extender is a combination of nepheline syenite and silica coated calcium fluoride. One non-limiting source of nepheline syenite is Minex 3 or Minex 4 offered by Unimin Inc. One non-limiting source of silica coated calcium fluoride is also offered by Unimin Inc. by the name UNI-05-1. The silica coated calcium fluoride generally has an average particle size of no larger than about 170 mesh; however, larger or smaller particles sizes can be used. The composition of the silica coated calcium fluoride was about 15-25 weight percent silica and about 75-85 weight percent calcium fluoride. The weight ratio of the silica coated calcium fluoride to nepheline syenite is generally about 0.1-1:1. As can be appreciated, other weight ratios can be used. Minex was used to at least partially replace calcium carbonate. The silica coated calcium fluoride was used to at least partially replace Celatom MW-27 and/or calcined clay. The use of Minex 3 and the silica coated calcium fluoride in the paint was found to closely match Celatom MW-27 with regard to paint color, resulting sheen of the paint and the resulting hiding power of the paint.

Several examples of the novel pigment extender of the present invention used in a flat white latex paint is set forth below. In each of these examples, a Dow Ucar emulsion system (vinyl-acrylic emulsion) was used as a standard formulation.

| | Ex. A (lbs./100 Gal.) | Ex. B(lbs./100 Gal.) |
|---|---|---|
| Grind | | |
| Celite 499 | 34.8/2.0 | 0/0 |
| Colloid 226/25 | 6.0/0.59 | 6.0/0.59 |
| Silica Coated Calcium Fluoride | 0/0 | 53.0/2.0 |
| Drewplus L-475 | 4.0/0.52 | 4.0/0.52 |
| Minex 3 | 131.53/6.05 | 131.53/6.05 |
| Propel GXL | 0.50/0.05 | 0.50/0.05 |
| Propylene Glycol | 10.0/1.16 | 10.0/1.16 |
| Snowflake PE | 175.0/7.75 | 175.0/7.75 |
| Sodium Hydroxide | 3.25/0.26 | 3.25/0.26 |
| Tergitol Np-9 | 2.2/0.25 | 2.2/0.25 |
| Tipure R-902 | 200.0/6.0 | 200.0/6.0 |
| Ucar Polyphobe 102 | 16.0/1.72 | 16.0/1.72 |
| Water | 358.0/43.0 | 358.0/43.0 |
| Let Down | | |
| Drewplus L-475 | 4.0/0.52 | 4.0/0.52 |
| Ucar Filmer IBT | 3.0/0.38 | 3.0/0.38 |
| Ucar Latex 379G | 200.0/22.1 | 200.0/22.1 |
| Ucar Polyphobe 102 | 18.3/1.98 | 18.3/1.98 |
| Water | 50.0/6.01 | 50.0/6.01 |
| Total | 1218.48/100.27 | 1234.24/100.27 |
| Pigment Cost ($/Gal.) | 2.56 | 2.55 |

| | Ex. C (lbs./100 Gal.) | Ex. D (lbs./100 Gal.) |
|---|---|---|
| Grind | | |
| AMP-95 | 2.0/0.25 | 2.0/0.25 |
| Silica Coated Calcium Fluoride | 56.0/2.11 | 80.0/3.02 |
| Minex 3 | 160.0/7.36 | 183.0/8.42 |
| Optiwhite | 150.0/8.2 | 113.5/6.21 |
| Propylene Glycol | 26.0/3.02 | 26.0/3.02 |
| Rhodoline 643 | 1.5/0.21 | 1.5/0.21 |
| Tamol 1124 | 10.0/1.01 | 10.0/1.01 |
| Tipure R-902 | 110.0/3.3 | 110.0/3.3 |
| Triton X-902 | 2.0/0.23 | 2.0/0.23 |
| Water | 184.0/22.09 | 184.0/22.09 |
| Let Down | | |
| Rhodoline 643 | 2.5/0.34 | 2.5/0.34 |
| Ucar Filmer IBT | 8.0/1.01 | 8.0/1.01 |
| Ucar Latex 379G | 148.0/16.35 | 148.0/16.35 |
| Ucar Polyphobe 102 or 107 | 16.0/2.41 | 16.0/2.41 |

-continued

| | | |
|---|---|---|
| Water | 267.5/32.11 | 267.5/32.11 |
| Total | 1143.5/99.43 | 1154.2/99.42 |
| Pigment Cost ($/Gal.) | 1.83 | 1.78 |

| | Ex. E (lbs./100 Gal.) | Ex. F (lbs./100 Gal.) |
|---|---|---|
| Grind | | |
| AMP-95 | 2.0/0.25 | 2.0/0.25 |
| Silica Coated Calcium Fluoride | 106.0/4.0 | 136.0/5.13 |
| Minex 3 | 183.0/8.42 | 183.0/8.42 |
| Optiwhite | 96.0/5.25 | 75.0/4.1 |
| Propylene Glycol | 26.0/3.02 | 26.0/3.02 |
| Rhodoline 643 | 1.5/0.21 | 1.5/0.21 |
| Tamol 1124 | 10.0/1.01 | 10.0/1.01 |
| Tipure R-902 | 110.0/3.3 | 110.0/3.3 |
| Triton X-902 | 2.0/0.23 | 2.0/0.23 |
| Water | 184.0/22.09 | 184.0/22.09 |
| Let Down | | |
| Rhodoline 643 | 2.5/0.34 | 2.5/0.34 |
| Ucar Filmer IBT | 8.0/1.01 | 8.0/1.01 |
| Ucar Latex 379G | 148.0/16.35 | 148.0/16.35 |
| Ucar Polyphobe 102 or 107 | 16.0/2.41 | 16.0/2.41 |
| Water | 267.5/32.11 | 267.5/32.11 |
| Total | 1162.7/99.44 | 1171.5/99.4 |
| Pigment Cost ($/Gal.) | 1.76 | 1.75 |

Several physical properties of the formulated paints containing the novel pigment extender were compared to the formulated paint that included Celetom MW 27. The results of these comparisons is set forth in Table 1.

TABLE 1

| | Ex. 1 | Ex. 2 | Ex. A | Ex. B |
|---|---|---|---|---|
| Test | | | | |
| Hegman Fineness (N.S.) | 1.5 | 2.0 | 2.5+ | 1.0+ |
| pH | 8.0 | 9.2 | ? | 8.5 |
| lbs./Gal. | 11.52 | 12.18 | 12.19 | 12.28 |
| Stormer (KU) init | 86 | 76 | 77 | 76 |
| ICI, Poise | 0.4 | 2.2 | 2.3 | 2.3 |
| Sag resistance (mils) | 12+ | 12+ | 12+ | 12+ |
| Contrast ratio (3 mils) | 96.6 | 98.4 | 98.5 | 98.7 |
| 85° Sheen (sealed) (6 mils) | 1.4 | 0.9 | 1.2 | 1.2 |
| 85° Sheen (unsealed) (6 mils) | 1.2 | 0.8 | 1.1 | 1.1 |
| Cwf2-Illuminant (Hunter) | | | | |
| L* | 96.1 | 95.2 | 95.4 | 95.3 |
| a* | −0.8 | −0.8 | −0.8 | −0.75 |
| b* | 3.0 | 2.2 | 2.2 | 2.5 |
| Brightness, Tappi T525 | 89.3 | 88.9 | 89.1 | 88.8 |
| PVC % | 71.4 | 63.1 | 63.1 | 63.1 |

| | Ex. C | Ex. D | Ex. E | Ex. F |
|---|---|---|---|---|
| Test | | | | |
| Hegman Fineness(N.S.) | 1.5+ | 1.5 | 1.5 | 1.5 |
| pH | 7.7 | 7.8 | 7.8 | 7.8 |
| lbs./Gal. | 11.52 | 11.59 | 11.69 | 11.72 |
| Stormer (KU) init | 91 | 94 | 95 | 90 |
| ICI, Poise | 0.5 | 0.6 | 0.6 | 0.6 |
| Sag resistance (mils) | 12+ | 12+ | 12+ | 12+ |
| Contrast ratio (3 mils) | 97.4 | 97.3 | 97.4 | 97.1 |
| 85° Sheen (sealed) (6 mils) | 1.7 | 1.2 | 1.1 | 1.1 |
| 85° Sheen (unsealed) (6 mils) | 1.5 | 1.1 | 1.0 | 1.0 |
| Cwf2-Illuminant (Hunter) | | | | |
| L* | 96.0 | 95.8 | 95.7 | 95.4 |
| a* | −0.7 | −0.7 | −0.7 | −0.6 |
| b* | 3.1 | 3.1 | 3.2 | 3.5 |
| Brightness, Tappi T525 | 89.1 | 88.8 | 88.4 | 87.4 |
| PVC % | 71.4 | 71.4 | 71.4 | 71.4 |

As set forth above, the formulations in Example 1 and Examples C-D illustrate similar paint formulations except for the type of pigment extender that is included in the paint. Likewise, Example 2 and Examples A and B illustrate similar paint formulations except for the type of pigment extender that is included in the paint.

As illustrated in Table 1, the use of the pigment extender of the present invention forms a flat white latex paint that is either comparable or superior to a flat white latex paint that includes the extender Celatom MW 27. The pigment extenders of the present invention all result in a flat white paint having a sheen value at 85° of less than 1.8. Several of the pigment extenders of the present invention result in a flat white paint having a sheen value of about 1-1.2. The sheen of the paint samples was tested after a two day drying period. Six mil coatings were used to test the sheen, color, gloss and brightness of each paint sample. Low sheen is desirable by painters to hide imperfections on the substrate surface. The pigment extenders of the present invention can be successfully used to reduce the sheen value of paints.

The pigment extender of the present invention not only can function as a flatting agent to reduce the sheen of the paint, the use of the pigment extender resulted in a paint having equivalent or superior hiding power as compared to a paint that included Celatom MW 27. The pigment extender of the present invention also resulted in a high contrast ratio for the paint. The contrast ratio was determined by measuring the light reflected over a white surface versus the amount of light reflected over a black surface multiplied by 100. The higher the reflectance over a black surface, the greater the contrast ratio or hiding power of the paint. The contrast ratio for each paint sample was measured after a two day drying period. A paint thickness of three mils was used for each contrast ratio test.

The cost of using the pigment extender for each sample was either comparable or less expensive than to a paint that included Celatom MW 27.

The pigment extenders illustrated in Examples C and D were shown to function as a partial substitute for Duramite (calcium carbonate). The pigment extenders illustrated in Examples E-H were shown to function as a full substitute for Duramite (calcium carbonate) and a partial substitute for Optiwhite (calcined clay). As such, the pigment extender of the present invention exhibited properties not only related to hiding power, the pigment extender also exhibited properties relating to a paint filler and a matting agent. The versatility of the pigment extender of the present invention thereby resulted in less need for more expensive components thereby reducing the cost of raw materials to form the paint.

The test results of the paint formulations revealed that silica coated calcium fluoride can be used as both a flatting agent and an extender. The silica coated calcium fluoride was found to increase the Stormer and ICI viscosity of the paint due to the high oil absorption properties of the silica coated calcium fluoride. The silica coated calcium fluoride was thus found to be a good full or partial substitute for calcined clay (an extender) without loss in the contrast ratio of the paint. Indeed in several paint formulations, the silica coated calcium fluoride increased the contrast ratio of the paint. The silica coated calcium fluoride was found to cause the L* and brightness of the paint to diminish only slightly when the content of the silica coated calcium fluoride exceeded about 3.0 gallons. The test results revealed that the best balance for matting efficiency, cost, and color was a pigment extender that included about 160-190 lbs. Minex 3 and about 70-90 lbs. silica coated calcium fluoride. This formulation of the pigment extender provided a good substitute for Celatom MW-27 in the paint. As can be appreciated, for different paint formulations, the best balance for Minex 3 and silica coated calcium fluoride in the paint may vary.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A pigment extender adapted for use in a covering agent, said pigment extender comprising metal fluoride particles, said metal fluoride particles including particles having a majority weight percent silica plus fluoride compound, said silica constituting up to about 50 weight percent of said metal fluoride particles and said fluoride compound constituting up to about 99.9 weight percent of said metal fluoride particles.

2. The pigment extender as defined in claim 1, wherein said silica constituting about 1-40 weight percent of said metal fluoride particles and said fluoride compound constituting about 60-99 weight percent of said metal fluoride particles.

3. The pigment extender as defined in claim 2, wherein said silica constituting about 5-30 weight percent of said metal fluoride particles and said fluoride compound constituting about 70-95 weight percent of said metal fluoride particles.

4. The pigment extender as defined in claim 3, wherein said silica constituting about 15-25 weight percent of said metal fluoride particles and said fluoride compound constituting about 75-85 weight percent of said metal fluoride particles.

5. The pigment extender as defined in claim 1, including nepheline syenite, a weight ratio of said metal fluoride particles to nepheline syenite in said pigment extender is about 0.1-1:1.

6. The pigment extender as defined in claim 5, wherein said weight ratio of said metal fluoride particles to nepheline syenite in said pigment extender is about 0.2-0.8:1.

7. The pigment extender as defined in claim 6, wherein said weight ratio of said metal fluoride particles to nepheline syenite in said pigment extender is about 0.3-0.6:1.

8. The pigment extender as defined in claim 1, wherein said metal fluoride particles includes metal fluoride coated with silica.

9. The pigment extender as defined in claim 8, wherein said metal fluoride particles includes metal fluoride coated with silica.

10. The pigment extender as defined in claim 1, wherein said metal fluoride particle have an average particle size of up to about 170 mesh.

11. A pigment extender adapted for use in a covering agent, said pigment extender comprising nepheline syenite and metal fluoride particle, said metal fluoride particles include particles having a composition of about 0.1-50 weight percent silica and about 50-99.9 weight percent metal fluoride.

12. The pigment extender as defined in claim 11, wherein said metal fluoride particle includes a silica coated metal fluoride.

13. The pigment extender as defined in claim 12, wherein a weight ratio of metal fluoride to nepheline syenite is about 0.1-1:1.

14. The pigment extender as defined in claim 13, wherein said metal fluoride particle includes calcium fluoride.

15. The pigment extender as defined in claim 14, wherein said metal fluoride particle has an average particle size of up to about 170 mesh.

16. The pigment extender as defined in claim 12, wherein said metal fluoride particle includes calcium fluoride.

17. The pigment extender as defined in claim 12, wherein said metal fluoride particle has an average particle size of up to about 170 mesh.

18. The pigment extender as defined in claim 11, wherein a weight ratio of metal fluoride to nepheline syenite is about 0.1-1:1.

19. The pigment extender as defined in claim 11, wherein said metal fluoride particle includes calcium fluoride.

20. The pigment extender as defined in claim 11, wherein said metal fluoride particle has an average particle size of up to about 170 mesh.

21. A paint having an 85 sheen value of less than about 2 comprising a pigment and a pigment extender, said pigment extender comprising nepheline syenite and metal fluoride particles, said metal fluoride particles include particles having a composition of about 0.1-50 weight percent silica and about 50-99.9 weight percent metal fluoride.

22. The paint as defined in claim 21, wherein said metal fluoride particle includes metal fluoride coated with silica.

23. The paint as defined in claim 22, wherein a weight ratio of metal fluoride to nepheline syenite is about 0.1-1:1.

24. The paint as defined in claim 23, wherein said metal fluoride particle includes calcium fluoride.

25. The paint as defined in claim 24, wherein said metal fluoride particle has an average particle size of up to about 170 mesh.

26. The paint as defined in claim 25, wherein said paint is a latex paint.

27. The paint as defined in claim 26, wherein said latex paint includes a polymer having interpolymerized units that comprise units derived from styrene, methyl styrene, vinyl, or combinations thereof and units derived from one or more acrylates, methacrylates, acrylonitrile, or combinations thereof.

28. The paint as defined in claim 27, wherein said pigment includes titanium dioxide.

29. The paint as defined in claim 21, wherein a weight ratio of metal fluoride to nepheline syenite is about 0.1-1:1.

30. The paint as defined in claim 21, wherein said metal fluoride particle includes calcium fluoride.

31. The paint as defined in claim 21, wherein said metal fluoride particle has an average particle size of up to about 170 mesh.

32. The paint as defined in claim 21, wherein said paint is a latex paint.

33. The paint as defined in claim 32, wherein said latex paint includes a polymer having interpolymerized units that comprise units derived from styrene, methyl styrene, vinyl, or combinations thereof and units derived from one or more acrylates, methacrylates, acrylonitrile, or combinations thereof.

34. The paint as defined in claim 21, wherein said pigment includes titanium dioxide.

35. A method for forming a paint having improved hiding power and low sheen comprising:

a. providing a latex paint;

b. adding a pigment and a pigment extender to said latex paint, said pigment extender comprising a nepheline syenite and metal fluoride particle, said metal fluoride particles include particles having a composition of about 0.1-50 weight percent silica and about 50-99.9 weight percent metal fluoride.

36. The method as defined in claim 35, wherein said metal fluoride particle includes metal fluoride with silica.

37. The method as defined in claim 36, wherein a weight ratio of metal fluoride to nepheline syenite is about 0.1-1:1.

38. The method as defined in claim 37, wherein said metal fluoride particle includes calcium fluoride.

39. The method as defined in claim 38, wherein said metal fluoride particle has an average particle size of up to about 170 mesh.

40. The method as defined in claim 39, wherein said latex paint includes a polymer having interpolymerized units that comprise units derived from styrene, methyl styrene, vinyl, or combinations thereof and units derived from one or more acrylates, methacrylates, acrylonitrile, or combinations thereof.

41. The method as defined in claim 40, wherein said pigment includes titanium dioxide.

42. The method as defined in claim 41, wherein said paint has an 85 sheen value of less than about 2.

43. A paint comprising a pigment and a pigment extender, said pigment extender comprising metal fluoride particles, said metal fluoride particles including particles having a majority weight percent silica plus fluoride compound, said silica constituting up to about 50 weight percent of said metal fluoride particles and said fluoride compound constituting up to about 99.9 weight percent of said metal fluoride particles.

44. The paint as defined in claim 43, wherein said paint has an 85 sheen of less than about 2.

45. The paint as defined in claim 43, wherein said pigment extender includes nepheline syenite, a weight ratio of said metal fluoride particles to nepheline syenite in said pigment extender is about 0.1-1:1.

46. The paint as defined in claim 43, wherein said metal fluoride particles of said pigment include metal fluoride coated with silica.

47. The paint as defined in claim 43, wherein said paint is a latex paint.

48. The paint as defined in claim 47, wherein said latex paint includes a polymer having interpolymerized units that comprise units derived from styrene, methyl styrene, vinyl, or combination thereof and units derived from one or more acrylates, methacrylates, acrylonitrile, and combination thereof.

49. The paint as defined in claim 43, wherein said pigment includes titanium dioxide.

50. The paint as defined in claim 43, wherein a weight ratio of pigment extender to said pigment is at least about 0.1:1.

51. The paint as defined in claim 50, wherein a weight ratio of pigment extender to said pigment is about 0.1-4:1.

* * * * *